July 25, 1933.  A. D'HALLOY  1,919,621

LOCK NUT DEVICE

Filed Dec. 1, 1931

INVENTOR
AUDOIN D'HALLOY
BY *R.C. Hopgood*
ATTORNEY

Patented July 25, 1933

1,919,621

UNITED STATES PATENT OFFICE

AUDOIN D'HALLOY, OF PARIS, FRANCE, ASSIGNOR TO INTERNATIONAL SAFETY LOCK NUT CORPORATION, OF NEW YORK, N. Y.

LOCK-NUT DEVICE

Application filed December 1, 1931. Serial No. 578,288.

This invention relates to a new and improved lock-nut device for use in connection with bolts, studs or the like and whilst particularly applicable for securing the wheels of motor vehicles, such as trucks, is nevertheless applicable to many other purposes where nuts are subject to considerable vibration.

An object of the invention is to provide a lock-nut device which calls for no operation in its application or removal other than the ordinary turning action and which at the same time does not damage the threads of the nut or the bolt or stud upon which it is screwed, thus permitting the same nut to be applied and removed over and over again. The device is so adapted that when it is screwed home and forced against the bed or work from which the bolt or stud projects it firmly grips the bolt and is secure against displacement by any vibration to which it may be subjected.

A further object is to provide a lock-nut device of this nature the elements of which remain in their assembled positions and cannot become separated when the device is removed from the work. Thus when the device has been removed from the work it is immediately ready for replacement and the danger of a part being lost or mislaid to the annoyance of the user is obviated.

According to my invention a lock-nut device comprises a threaded nut portion having a resilient threaded sleeve portion, a resilient split ring adapted to cooperate with said resilient sleeve portion in such a manner that the said sleeve portion grips the thread of the bolt or stud radially when the nut is screwed home and a holding cap, which is held on the head of the nut and which retains said split ring in its cooperating position with respect to said sleeve portion.

Figure 1:
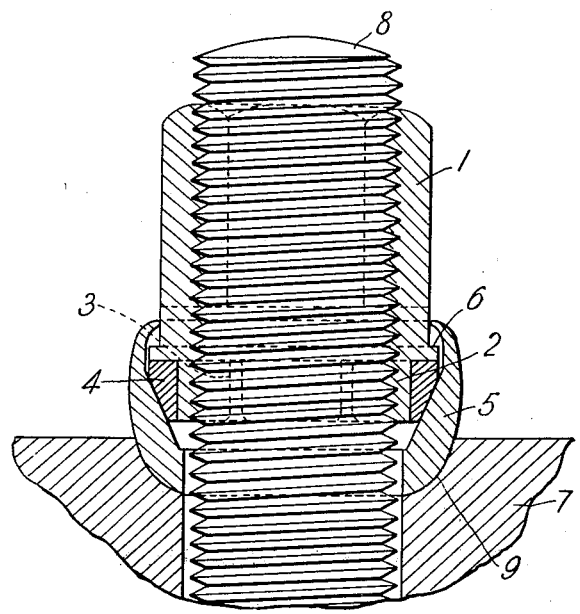
Figure 2:
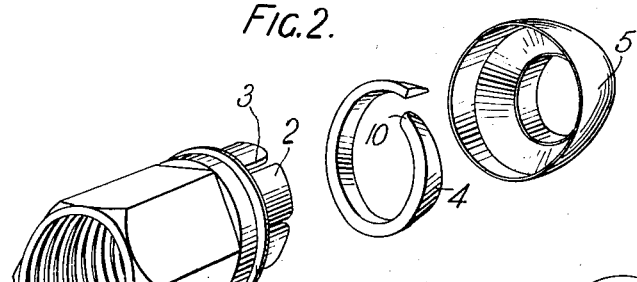
Figure 3:
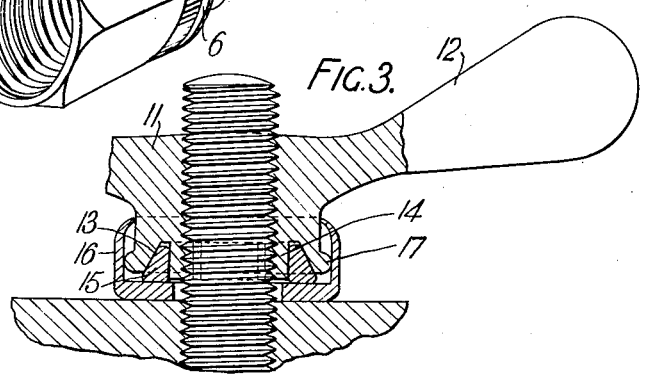

Two embodiments of the invention are shown in the accompanying drawing in which Fig. 1 is a vertical section of a lock-nut device for securing the wheels of automobiles the device being shown in position on a bolt or stud, Fig. 2 is an exploded view showing the various parts in perspective and Fig. 3 is a vertical section of a modified form of the device specially adapted for securing the wheels of bicycles and motor bicycles.

Referring first to Figures 1 and 2, in these figures the nut portion 1 is formed with a threaded reduced sleeve portion 2 which is rendered resilient in any suitable known manner either by the provision of radial slits 3, as shown, or by boring a series of holes in this sleeve or by making the sleeve 2 itself sufficiently thin. The slits 3 are provided at their lower open ends with a slight throat thus avoiding sharp corners which might give rise to a binding action and cause consequent damage to the parts when the nut is screwed or unscrewed.

A split ring 4 of wedge-shaped cross-section is adapted to encircle the resilient sleeve portion 2. This ring 4 when not under tension is in the form of a flat helix and is thereby elastic in both its axial and radial directions. It should be noted that the sharp point on the ring at the split which comes into contact with the nut portion is rounded off as shown at 10. This prevents the ring 4 from biting into the nut portion at this point and facilitates the unscrewing of the device. The ring 4 is adapted to be retained in its co-operating position with respect to the sleeve 2 by a cup-shaped cap 5 the edge of which is spun or otherwise turned over a lip 6 on the nut portion 1 and thereby holds the assembled parts in their co-operating positions.

Preferably the ring 4 and cap 5 have the cross-sections shown in Fig. 1 so that when the nut 1 is tightened the holding cap 5 is forced against the work piece 7 and presses upon the ring 4 with a double wedging action which forces the resilient threaded sleeve portion 2 of the nut 1 radially on the threads of the bolt 8. It should be noted that the ring 4 is under pressure in both the axial and radial directions of the bolt 8 and thus absorbs any vibrations to which the device may be subjected. It should also be noted that the inherent annular elasticity of the cap 5 adds to the effect of the elasticity of the ring 4 and increases the locking action.

Preferably the nose of the cap 5 is rounded so as to cooperate with a seating 9 on the work piece 7 but this is not essential. The surface of the cap where it contacts with the work piece may be flat and in general the cap may be of any desired shape provided that it cooperates with the ring 4 to cause it to produce the wedging action. Also the surface of the cap 5 where it engages the work piece may be provided with striations or may be roughened in any other manner if the particular requirements render this advisable.

To remove the device it is only necessary to unscrew the nut portion in the usual manner. This relieves the pressure on the cap 5 and therefore the pressure on the ring 4 which thereupon expands and releases the pressure on the resilient sleeve portion 2. It will be readily appreciated that the cap 5 besides fulfilling the purpose of retaining the device in its assembled condition with the parts in their cooperating positions when removed from the work piece, also constitutes an integral and essential part of the whole device since when the nut 1 is tightened the cap acts upon the resilient ring 4 to produce the wedging action which locks the nut and being of itself resilient adds to this effect.

Figure 3 shows the invention applied to a "butterfly" nut of the type commonly used for securing the wheels of bicycles and motorbicycles. The nut portion 11, which is provided with two wings 12, is formed with an annular groove or channel 13 which is concentric with the screw thread and which is substantially triangular in cross-section. The inner wall of this groove is thus constituted by a thin threaded sleeve portion 14 which is rendered resilient by the provision of a number of vertical slits.

A resilient helicoidal split ring 15, also of substantially triangular or wedge-shaped cross-section, engages in the annular groove 13, and is retained by its cooperating position by a cap 16 the edge of which is turned over a lip 17 on the nut. The engaging surface of the cap is flat and may if desired be provided with striations or serrations or roughened in any other manner to prevent lateral slipping of the device as a whole.

The operation of the device is similar to that of the embodiment already described with reference to Figs. 1 and 2.

Lock-nut devices of the type herein described have been found to be particularly suitable for securing the wheels of automobiles and other vehicles to their axles. When the lock-nuts have been tightened they are proof against even the most severe vibration yet at the same time they may be removed in the ordinary manner without the use of any special tools if it is desired to change a wheel. They are, moreover, particularly suitable for securing members composed of brittle or fragile metals or materials such as aluminum or wood which might be damaged by direct contact with the split ring.

What is claimed is:

In a lock-nut device, a threaded nut portion having a reduced resilient sleeve portion, a resilient helicoidal split ring encircling said sleeve portion and adapted to cooperate therewith and a cup-shaped holding cup located on the nose of the nut which cap retains said ring in its cooperating position with respect to said sleeve portion and when the nut is screwed home is forced against the work piece and in its turn compresses said resilient ring causing it to exert pressure in both axial and radial directions relative to the bolt.

AUDOIN D'HALLOY.